Patented June 18, 1935

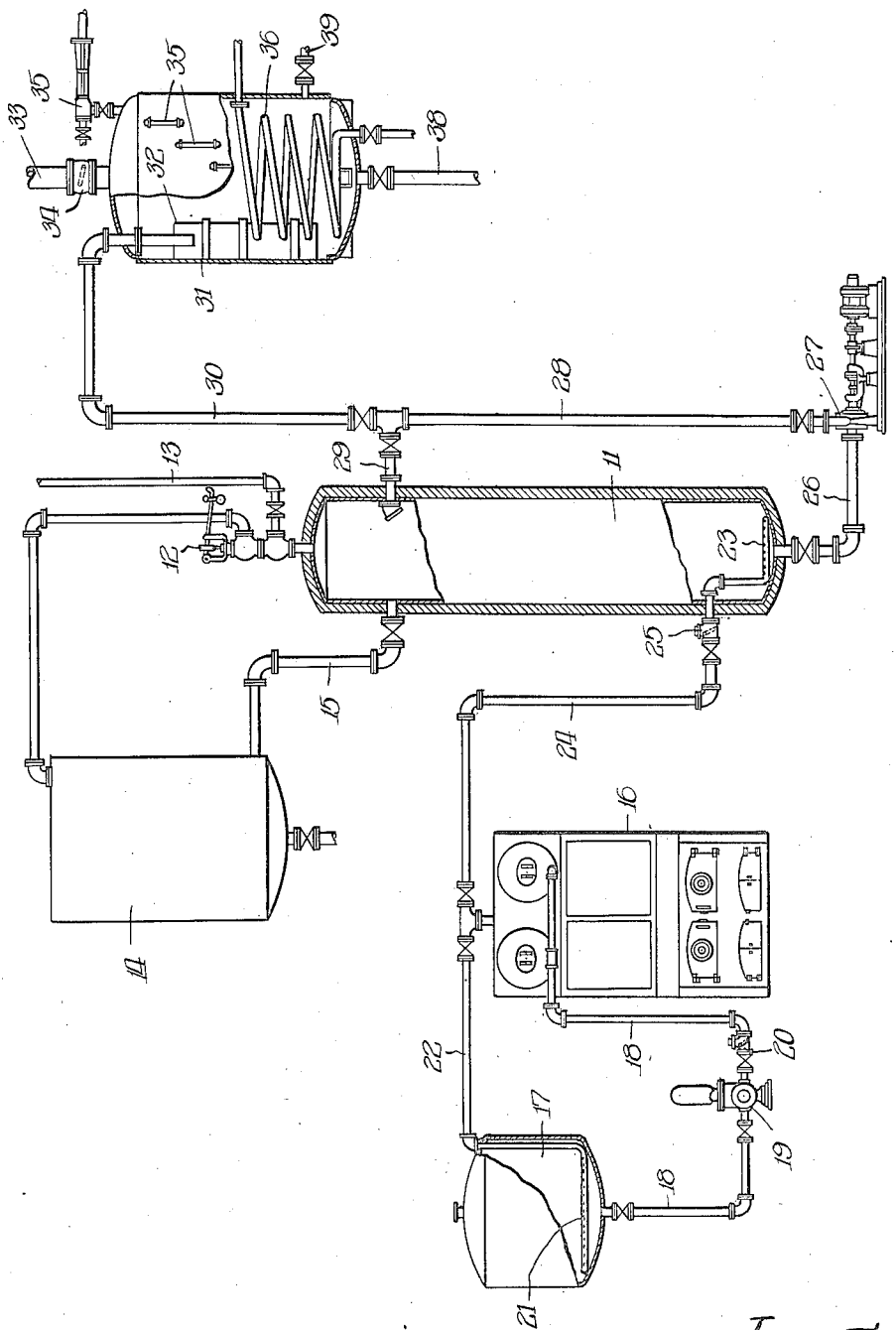

2,005,447

UNITED STATES PATENT OFFICE 2,005,447

APPARATUS FOR SPLITTING FATS

Oscar H. Wurster, Chicago, Ill.

Application October 23, 1931, Serial No. 570,681

1 Claim. (Cl. 87—4)

The present invention relates to the hydrolysis of fats and oils, and has particular reference to an improved process and apparatus by which the aqueous saponification of animal and vegetable fats and oils and fish oils into fatty acids and glycerol is facilitated.

Animal and vegetable fats and oils and fish oils may be saponified and hydrolyzed or split by various processes. The methods most commonly used commercially are the open-kettle saponification, the Twitchell process, and the autoclave method.

In the open-kettle process the fat is boiled at atmospheric pressure with caustic soda or other strongly alkaline material and water, the products of the resulting reaction being soap and a water solution of glycerine.

While the open-kettle method has many advantages, it is objectionable in some respects, due to the necessity of using caustic alkalis, the impure state and high salt content of the glycerine liquors recovered, and the fact that a soap is formed, whereas frequently fatty acids are desired.

The Twitchell process comprises hydrolyzing or splitting fats in a closed tank at atmospheric pressure by boiling with steam in the presence of about 1 per cent of sulphuric acid and a quantity of water. In addition to the acid, a relatively small amount (usually from 0.5 to 2.5 per cent) of a chemical reagent, such as a sulfo-derivative of a fatty acid, is employed and acts catalytically to split the fat into fatty acids and glycerine.

The autoclave process in general comprises hydrolyzing the fats and oils in a pressure vessel with steam. Although the details of the autoclave process vary widely, in a conventional modification the steam is employed at a pressure between 100 and 150 pounds per square inch and a small amount of catalyst, such as a metallic oxide or hydroxide, is used to expedite the splitting reaction.

It is known that in the autoclave process, hydrolysis may be obtained without the use of catalysts, but in such cases the velocity of the splitting reaction has been so low as to preclude extensive commercial application. Aqueous saponification without the use of a catalyst is advantageous, since it is then unnecessary to subject the fatty acids and glycerine sweet water to purifying treatments prior to utilization. For example, it is ordinarily possible to employ the fatty acids obtained by aqueous saponification for the production of white soap.

Where a catalyst is employed, both the fatty acids and the glycerine sweet water are contaminated to a certain extent by the catalyst and reaction products thereof, necessitating additional processing to remove the resulting impurities.

A primary object of the present invention is the effective aqueous saponification of fats and oils, whereby fatty acids and glycerol of great purity are obtained.

An additional object is the aqueous saponification of fats and oils in large batches by an improved autoclave process which facilitates operation, saves steam, and reduces the cost of splitting the fats and oils into fatty acids and glycerine.

Another object is the aqueous saponification of large batches of fats and oils under such conditions that an efficient splitting is obtained without the use of a catalyst.

Still another object is the saponification of fats and oils to obtain fatty acids and glycerine of good color.

These and other objects will become apparent from a consideration of the following illustrative and explanative description.

I have found that fats and oils may be effectively saponified by charging the same into an autoclave and maintaining in the autoclave a steam pressure between 200 and 250 pounds per square inch and a temperature between 375° F. and 425° F. The time required for a cycle of operation wherein a split of approximately 92 per cent to 98 per cent is obtained generally amounts to between 4 and 12 hours.

Autoclaves which have been known heretofore are characterized by their relative smallness, for example, by a capacity of 2,000 to 8,000 pounds. Consequently, a relatively large number of autoclaves have been necessary in plants having a substantial output, and operating and equipment costs have been excessive as compared to the Twitchell process in which batches of from 30,000 pounds to 60,000 pounds are common.

Several factors have contributed to limit the size of autoclaves known heretofore.

The materials suitable for autoclave construction are somewhat limited, copper being the one which has found favor heretofore. These autoclaves were approximately four feet in diameter and about twenty-two feet long. The walls were constructed of fabricated copper of approximately one inch thickness. The tensile strength of a container of this nature was sufficient to withstand working pressures of from 100 to 150 pounds per square inch. However, upon extended use, the vessel lost strength, due to crystallization of the copper, making necessary replacement of the autoclave.

Also, in the autoclave process as the size of the batch increases the velocity of the reaction or the completeness of the splitting tends to decrease. Consequently, it has been advantageous to operate with a relatively small amount of material.

In accordance with my invention, the objections to operation with a relatively large batch are removed. I have found a number of materials which are chemically resistant to the fatty acids, which do not discolor the fatty acids, and which possess sufficient tensile strength and other physical properties to withstand extended use when employed to construct an autoclave of; for example, 30,000 pounds capacity. Representative of these materials are nickel, nickel clad steel, Monel metal, and Everdur. Other metals or alloys or lined metals which will not discolor the fatty acids and which have the necessary chemical resistance to fatty acids under the temperatures and pressures required in combination with the necessary tensile strength and other physical properties needed for strength and fabrication may also be employed.

I have found that the decreased efficiency which has heretofore characterized operation of the autoclave process with large batches is due to a considerable extent to the insufficient contact or incomplete emulsification of the fats and oils and the water. As the size of the batch increases there is a greater tendency for the oil and water to separate, and as a consequence, the rate and amount of hydrolysis is cut down.

In accordance with my invention, a stream is taken from the autoclave, passed through an emulsifier, and returned to the autoclave, thereby insuring that the oil and water are intimately admixed, and I have found this procedure greatly improves the completeness and velocity of the reaction.

It has also been characteristic of prior autoclave processes that the fatty acids and glycerine acquire a certain amount of color which is indicative of chemical change other than saponification. I have found that this color may be eliminated by effecting the process under non-oxidizing conditions. To accomplish this, the autoclave and settling tank are exhausted of air, and the water used for production of the steam is deaerated.

My invention will now be described with reference to the accompanying drawing, in which The single figure is a diagrammatic view of apparatus suitable for use in accordance with my invention.

The numeral 11 represents an autoclave or reaction vessel which is provided with a pressure relief valve 12 and a valve-controlled vent line 13. For a 25,000 pound charge of fat or oil it is desirable to provide an autoclave approximately six feet in diameter and thirty feet in height. Suitable insulating material is employed to decrease heat loss from the apparatus.

The charge of fat or oil is supplied to the autoclave from tank 14 through valve-controlled line 15.

The steam boiler 16 is fed with water from tank 17 through valve-controlled line 18, the latter being provided with pump 19. To prevent reverse flow, line 18 is also provided with a check valve 20.

To deaerate the water supply to the boiler, tank 17 is provided with a perforated steam coil 21 which is connected to the boiler by valve-controlled line 22.

Steam is supplied from the boiler to the open steam coil 23 by valve-controlled line 24. The line 24 is provided with a check valve 25 to prevent reverse flow from the autoclave to the boiler.

A valve-controlled line 26 leads from the lower portion of the autoclave 11 to the circulating and emulsifying pump 27 having a discharge line 28. Communicating with the upper end of line 28 is a valve-controlled line 29, the open end of which extends into the upper portion of the autoclave and preferably above the liquid level thereof. Valve-controlled line 30 also communicates with line 28, and leads therefrom into blow-out tank 31.

The blow-out tank 31 is designed to receive the saponified mixture from the autoclave and to effect separation of the fatty acids from the glycerine sweet water. The end of line 30 extends downwardly into the blow-out tank and is received by a muffler 32. In the modification shown in the drawing the muffler comprises a vertical cylinder appreciably larger than line 30 and extending from the discharge end of said line downwardly adjacent the bottom of the blow-out tank.

Communicating with the top of the blow-out tank is a vent pipe 33 having a check valve 34. It is preferred to exhaust the air from the blow-out tank prior to discharging the fatty acid mixture therein, and for this purpose steam jet ejector 35 is connected to the top of the tank. The tank is provided with a cooling coil 36. Gauge glasses 35 permit an accurate observation of the liquid level within the tank.

Valve-controlled line 38 communicates with the bottom of the blow-out tank and serves to draw off the glycerine sweet water after separation has occurred. The fatty acids are withdrawn through valve-controlled line 39 communicating with the side of the tank.

In operation, a batch of fat or oil is charged from tank 14 through line 15 into the autoclave 11. The water in tank 17 is deaerated by blowing steam through the coil 21, and is then supplied to the boiler. Steam at a pressure of 200 to 250 pounds and free of air is discharged into the fat or oil through open coil 23. As the temperature of the fat or oil is relatively low, a considerable amount of steam is condensed to form water. The endothermic chemical reaction of the hydrolysis process and heat lost from the apparatus also cause the condensation of an additional quantity of steam so that the quantity of the charge of material in the autoclave varies as the process continues. The amount of condensed steam at the end of the saponification process will preferably be equal to a maximum of about two-thirds of the fat charge. Where a 20,000 pound batch of fat is employed, the total glycerine sweet water at the end of the process will approximate 13,000 pounds, the total charge in the autoclave therefore being approximately 33,000 pounds. If the insulation of the equipment is so efficient that the condensation during the process is materially less than one-half to two-thirds of the fat charge, it is preferred to add an amount of water to the autoclave at the beginning of the process.

The steam raises the temperature of the fat material to approximately 375° to 425° F., the exact temperature being dependent upon the pressure of the steam and other variable operating factors. It also causes an intermixture of the water and fat or oil. At the temperature and pressure involved and in a state of intimate intermixture with water, the fat is hydrolyzed to form fatty acids and glycerine. The velocity of the reaction depends to a large extent upon the intimacy of admixture of the fat and water. In my preferred process, wherein a relatively large batch of oil is treated, and wherein no soap-forming reagent is employed, the problem of intermixture or emulsification is quite important. For this reason a stream is drawn from the autoclave through line 26 and is passed through an emulsifying pump 27, from which the stream is returned to the autoclave through lines 28 and 29. The rate of circulation and emulsification is desirably such that the equivalent of the entire charge goes through the pump in approximately five minutes. The exact rate will depend in any case upon the particular operating conditions and the materials being treated.

A split of approximately 92 to 98 per cent may be obtained in about 4 to 8 hours, depending upon the materials and operating factors. Allowing time for charging and discharging, a cycle of 6 to 10 hours may be taken as a convenient and practical working basis.

When the saponification reaction within the autoclave is sufficiently complete, line 29 is closed and the material is charged through line 30 into the blow-out tank 31, from which the air has preferably been exhausted. The saponified mixture discharges from the end of line 30 into muffler 32 which permits the liquid to flow to the bottom of the tank out of contact with any oxygen which may be left in the tank, and at the same time permits vapors from the liquid to escape at the top of the muffler pipe, thereby preventing splashing.

It is desirable to transfer the materials from the blow-out tank to sources of disposal by gravity flow. For this reason, the blow-out tank is suitably elevated, and the steam pressure within the autoclave is employed to lift the hydrolyzed mixture into the blow-out tank. The steam pressure is thereby utilized and pumping costs are reduced considerably.

When the hydrolyzed mixture is being transferred to the blow-out tank, the pump 27 is allowed to idle, so that no resistance to the flow of liquid is offered.

The discharge of the saponified mixture into the blow-out tank has a "flashing" effect and the considerable amount of vapors produced thereby escape from the top of the tank through the pipe 33. These vapors are effective to displace air from the tank and consequently decrease oxidation of the oil.

The charge in the blow-out tank is cooled and allowed to settle. After the separation is complete, the glycerine sweet water which has settled to the bottom of the tank is drawn off through line 38, and due to its purity may be run direct to the evaporating equipment. If the quality of the fat or oil saponified is sufficiently poor to impart an excessive amount of organic impurities to the sweet water, the latter may be treated with a coagulent and filtered before evaporation is effected. After separation and cooling to a temperature sufficiently low that oxidation does not occur, the fatty acids may be transferred directly from line 39 to a soap kettle, to seeding pans, or to storage. Ordinarily, it is desirable to cool the fatty acids to below 165° F.

By the term "fats" as used in the claim it is intended to include animal and vegetable fats and oils and fish oils.

The several modifications coming within the spirit of my invention are intended to be included in the appended claim.

I claim:

A blow-out device for use in combination with an autoclave saponification apparatus, comprising a closed tank having an inlet pipe extending into the upper portion thereof, a cylindrical casing surrounding the end of said pipe and extending adjacent the bottom of the tank, a check valve-controlled vent in the top of said tank, means for exhausting air from said tank, cooling means for said tank, and an outlet line for withdrawing materials separated in said tank.

OSCAR H. WURSTER.